United States Patent
Wagner et al.

(10) Patent No.: US 12,470,161 B2
(45) Date of Patent: Nov. 11, 2025

(54) METHOD FOR OPERATING AN ELECTRIC MACHINE, DEVICE FOR OPERATING AN ELECTRIC MACHINE, AND ELECTRIC DRIVE SYSTEM

(71) Applicant: Robert Bosch GmbH, Stuttgart (DE)

(72) Inventors: Phillip Wagner, Ludwigsburg (DE); Gunther Goetting, Stuttgart (DE); Michele Hirsch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 18/254,926

(22) PCT Filed: Oct. 14, 2021

(86) PCT No.: PCT/EP2021/078434
§ 371 (c)(1),
(2) Date: May 30, 2023

(87) PCT Pub. No.: WO2022/117253
PCT Pub. Date: Jun. 9, 2022

(65) Prior Publication Data
US 2024/0030847 A1    Jan. 25, 2024

(30) Foreign Application Priority Data
Dec. 1, 2020 (DE) .................... 10 2020 215 125.3

(51) Int. Cl.
*B60L 3/00* (2019.01)
*H02P 21/00* (2016.01)
*H02P 21/08* (2016.01)

(52) U.S. Cl.
CPC .......... *H02P 21/08* (2013.01); *H02P 21/0017* (2013.01)

(58) Field of Classification Search
CPC .... H02P 21/08; H02P 21/0017; G01R 31/343
See application file for complete search history.

(56) References Cited

U.S. PATENT DOCUMENTS

2008/0116842 A1   5/2008  Cheng et al.
2017/0305274 A1*  10/2017 Saha ........................ B60L 3/003

FOREIGN PATENT DOCUMENTS

CN   107294450 A  *  10/2017
DE     19961798 A1      8/2001
(Continued)

OTHER PUBLICATIONS

Translation of International Search Report for Application No. PCT/EP2021/078434 date Jan. 14, 2022 (2 pages).

*Primary Examiner* — Cortez M Cook
(74) *Attorney, Agent, or Firm* — Michael Best & Friedrich LLP

(57) ABSTRACT

The invention relates to a method for operating an electric machine (2) comprising a rotatably mounted rotor and a motor winding that is electrically connected to an electrical energy store (4) by means of a power electronics (3). In said method, the machine (2) and/or an apparatus comprising the machine (2) is/are monitored in respect of fault events, and the motor winding is short-circuited by triggering the power electronics (3) upon detection of a fault event. According to the invention, a desired trajectory (T) for an actual current vector ($i_{actual,dq}$) of an electric motor current flowing through the motor winding is ascertained, said desired trajectory (T) extending from a current actual working point (AP1) of the machine (2) to a short-circuit working point (AP2) of the machine (2), a pilot control action is predicted according to the desired trajectory (T), and the power electronics (3) are triggered to short-circuit the motor winding according to the pilot control action in such a way that when the motor winding is short-circuited, a curve (V) of the actual current vector ($i_{actual,dq}$) at least substantially matches the desired trajectory (T).

15 Claims, 4 Drawing Sheets

(56) References Cited

FOREIGN PATENT DOCUMENTS

EP 3545617 10/2019
WO 2015090754 A1 6/2015

\* cited by examiner

METHOD FOR OPERATING AN ELECTRIC MACHINE, DEVICE FOR OPERATING AN ELECTRIC MACHINE, AND ELECTRIC DRIVE SYSTEM

BACKGROUND

The invention relates to a method for operating an electric machine comprising a rotatably mounted rotor and a motor winding, the motor winding being electrically connected to an electric energy store by means of power electronics, whereby the machine and/or an apparatus comprising the machine is/are monitored in respect of fault events, and the motor winding is short-circuited by triggering the power electronics upon detection of a fault event.

In addition, the invention relates to a device for operating an electrical machine having a control unit.

The invention further relates to an electric drive system.

An electric machine typically comprises a rotatably mounted rotor and a motor winding. The rotor can be driven or rotated by means of a suitable powering of phases of the motor winding. For example, the motor winding is a housing-fixed stator winding arranged in a distributed manner around the rotor. In order to achieve a desired powering of the motor winding or the phases of the motor winding, the motor winding is typically electrically connected to an electrical energy store by means of power electronics. For example, the power electronics comprise a different half bridge having two switching elements for each of the phases of the motor winding. The powering of the motor winding is then controlled by triggering the power electronics.

It is known from the state of the art to transition the electric machine into a safe state in case of a fault event. The machine and/or an apparatus comprising the machine are thus monitored in respect of fault events, and the machine is transitioned into the safe state upon detection of a fault event. For example, an active short-circuit (AKS) of the motor winding is set as the safe state. In this respect, upon detection of a fault event, the motor winding is short-circuited by triggering the power electronics. This is achieved, for example, in that the switching elements of the power electronics are controlled such that the switching elements switch conductively. The fault events can be fault events of the electric machine itself, or fault events of the apparatus comprising the electric machine. For example, if the machine is part of a motor vehicle, the fault events can also be fault events of the motor vehicle. Possible fault events include, e.g., sensor fault events, software fault events, overvoltage or overcurrent fault events, defects or partial defects of powertrain components, or an accident of the motor vehicle.

Various procedures for short-circuiting the motor winding are known in this context. In what is referred to as hard AKS, the motor winding is actively short-circuited from the current actual working point. In hard AKS, a transient short-circuit current arises in the motor winding, which can be so high that permanent magnets of the rotor become demagnetized. To reduce the transient short-circuit current, a soft AKS can be performed. In this case, a voltage vector is shorted sequentially until the zero voltage, i.e. the active short-circuit, is reached. Such a method is described, for example, in disclosure publication WO 2015 090 754 A1. A method for short-circuiting a motor winding performed according to a DC link voltage of a DC link capacitor of the power electronics is known from patent EP 3 545 617 A1.

SUMMARY

The method according to the invention is characterized in that a desired trajectory for an actual current vector of an electric motor current flowing through the motor winding is ascertained, said desired trajectory extending from a current actual working point of the machine to a short-circuit working point of the machine, whereby a pilot control action is predicted according to the desired trajectory, and the power electronics are triggered to short-circuit the motor winding according to the pilot control action in such a way that when the motor winding is short-circuited, a curve of the actual current vector at least substantially matches the desired trajectory. In this context, the term "motor current" is understood to mean the entirety of the electric phase currents flowing through the phases of the motor winding. In this respect, the current vector describes the electric phase currents. Preferably, the current vector describes the phase currents relative to a rotor-fixed coordinate system. A torque-forming current iq in this case forms a first directional component of the current vector. A flow-forming current id forms a second directional component of the current vector. The term "short-circuit working point of the electric machine" is understood to mean the working point that the machine assumes when the motor winding is short-circuited. Each working point of the electric machine matches a respectively different current vector. According to the invention, it is provided that a desired trajectory is ascertained that extends from the current working point to the short-circuit working point. According to the desired trajectory, a pilot control action is predicted and the power electronics are controlled according to the pilot control action in such a way that the curve of the actual current vector at least substantially matches the desired trajectory when the motor winding is short-circuited. By ascertaining the desired trajectory and the corresponding triggering of the power electronics, a desired transition of the electric machine from the current actual working point into the short-circuit working point can be specified particularly precisely. For example, it can be achieved that the short-circuit working point is set in a time-optimized manner at a low transient short-circuit current. Preferably, the desired trajectory is ascertained such that the transition from the actual working point into the short-circuit working point is at least substantially time-optimized. Preferably, a control sequence comprising multiple desired voltage vectors is predicted as the pilot control action. In order to trigger the power electronics according to the pilot control action, multiple triggering signals for the power electronics are then ascertained according to the control sequence, and the power electronics is triggered according to the triggering signals.

According to one preferred embodiment, it is provided that the desired trajectory is ascertained according to the current working point during operation of the electric machine. The pilot control action is thus ascertained "online" according to the current actual working point. This results in the advantage that a suitable desired trajectory can be ascertained for any current actual working points desired. Accordingly, based on any current actual working points, the short-circuit working point can be set along the desired trajectory. If the desired trajectory is ascertained during operation of the electric machine, the pilot control action during operation of the electric machine is also predicted. Preferably, the pilot control action predicted during operation of the electric machine is intermediately stored for a specified amount of time, i.e. temporarily, so that the predicted pilot control action is available for the specified amount of time and can be specified and used as the basis for triggering the power electronics.

Preferably, the desired trajectory is ascertained in pilot control action tests. The desired trajectory is thus ascertained "offline", e.g., during the application process of the electric machine at the factory. Accordingly, the desired trajectory during operation of the electric machine need not first be ascertained. This results in the advantage that no computational capacity for ascertaining the desired trajectory need be retained in a control unit designed to determine the triggering signals for the power electronics. In addition, this results in the advantage that the pilot control action is available particularly quickly compared to the determination of the desired trajectory during operation of the electric machine. If the desired trajectory is ascertained in pilot control action tests, then the pilot control action is preferably also predicted in the pilot control action tests. The pilot control action is then stored in a data store associated with the electric machine. Alternatively, the triggering signals in the pilot control action tests are also preferably ascertained, in which case the triggering signals are then stored in the data store.

Preferably, a desired trajectory is ascertained for multiple potential actual working points. Multiple potential actual working points are thus specified, and a desired trajectory is ascertained for each of these actual working points. This is particularly advantageous when the desired trajectories are ascertained in pilot control action tests. For example, multiple potential actual working points are predicted, each lying on a MTPA (maximum torque per ampere) curve of the electric machine, and a desired trajectory is ascertained for each of these actual working points. If a respective desired trajectory is ascertained for multiple actual working points, then a pilot control action is preferably also predicted for each of the desired trajectories. Said multiple pilot control actions are then stored in the data store, particularly preferably in a characteristic map. Alternatively, the triggering signals ascertained according to the multiple pilot control actions are preferably stored in the characteristic map.

Preferably, the desired trajectory is ascertained according to a model of the electric machine. The ego dynamics of the electric machine are thus considered when determining the desired trajectory. In particular, the model of the electric machine describes the correlation between the electrical terminal voltages applied to the phases of the motor winding on the one hand and the phase currents caused by the terminal voltages on the other hand. For example, the model contains information regarding both the inductances and the electrical resistances of the machine.

According to one preferred embodiment, it is provided that a threshold current value is specified, in which case the desired trajectory is ascertained according to the threshold current value in such a way that a current value of the actual current vector always falls below the threshold current value when short-circuiting the motor winding. Power values that exceed the threshold current value are thus avoided. Such high current values could lead to a demagnetization of the permanent magnets of the rotor and are accordingly undesirable.

Preferably, a threshold voltage value is specified, in which case the desired trajectory is ascertained according to the threshold voltage value in such a way that voltage values of electrical terminal voltages of the machine always fall below the threshold voltage value when short-circuiting the motor winding. This too avoids an overcharging of the electric machine when short-circuiting.

According to one preferred embodiment, it is provided that the desired trajectory is ascertained according to a DC link voltage of a DC link of the power electronics. By considering the DC link voltage, the DC link or a DC link capacitor of the DC link can be protected against overvoltages when the motor winding is short-circuited. In particular, upon short-circuiting, an electrical connection of the energy store to the power electronics is interrupted. This is referred to as load shedding. The energy store then no longer has a charge-balancing effect on the DC link. By considering the DC link voltage when ascertaining the desired trajectory, it can be achieved that the DC link capacitor or the DC link is nevertheless protected against overvoltages.

Preferably, a voltage threshold for the DC link voltage is specified, in which case the desired trajectory is ascertained according to the voltage threshold in such a way that the DC link voltage always falls below the voltage threshold when the motor winding is short-circuited. This avoids the overvoltages exceeding the voltage threshold.

According to a preferred embodiment, it is provided that a desired voltage for the DC link voltage is specified, in which case the desired trajectory is ascertained according to the desired voltage in such a way that the DC link voltage matches the desired voltage upon reaching the short-circuit working point. An electrical voltage is preferably predetermined as the target voltage resulting in no damage to the DC link. For example, the nominal voltage of the DC link capacitor is specified as the desired voltage. In order for the DC link voltage to match the desired voltage when the short-circuit working point is reached, the desired trajectory is ascertained or selected in particular in such a way that the DC link is discharged at least temporarily when the motor winding is short-circuited.

According to one preferred embodiment, it is provided that the desired trajectory is ascertained by a model predictive controller. Model predictive control (MPC) is generally known from the prior art. By means of the model predictive controller, a desired trajectory that describes a time-optimized transition from the actual working point into the short-circuit working point can be precisely ascertained, so that a setting of the short-circuit working point that is at least substantially time-optimized is achieved as a result of the pilot control action predicted according to the desired trajectory. Preferably, the model predictive controller ascertains the desired trajectory according to the model of the machine, the specified threshold current value, and the specified threshold voltage value. Particularly preferably, the model predictive controller also considers the DC link voltage of the DC link when ascertaining the desired trajectory, e.g., in the form of the voltage threshold and/or the desired voltage. Preferably, the pilot control action is predicted by the model predictive controller.

According to a preferred embodiment, it is provided that a sensor signal of at least one sensor is compared to a specified threshold value and that the fault event is sensed according to the comparison. For example, it is detected that the fault event is present when the sensor signal exceeds the threshold value or when the sensor signal falls below the threshold value. The comparison is in this case preferably based on the sensor signal of a sensor in which at least one of the potential fault events is evident when the fault event occurs. For example, the fault event is a defect or a partial defect of a component of the electrical machine. Such defects cause, e.g., overcurrents and/or overvoltages in the power electronics and/or the motor winding. Accordingly, the comparison is preferably based on the sensor signal of a sensor designed to monitor the power electronics and/or the motor winding. However, the fault event can also be an accident of the motor vehicle. Accordingly, the comparison is preferably based on the sensor signal of an accelerometer fixably arranged on the vehicle body. Preferably, the sensor signals of different sensors are compared to respectively different threshold values.

According to one preferred embodiment, it is provided that the electric machine, upon detection of the fault event, is controlled into the short-circuit working point according to the pilot control action. The motor winding is thus short-circuited in an uncontrolled manner according to the pilot control action. An adjustment of the short-circuit to a sensor signal of a control unit is preferably omitted. In this context, the term "control unit" is understood to mean a device whose sensor signal is considered in the control of the machine during normal operation of the machine. A rotary sensor associated with the rotor, a current sensor associated with the power electronics or the motor winding, and a voltage sensor associated with the motor winding are examples of such control units. This results in the advantage that the curve of the actual current vector upon the short-circuit matches the desired trajectory, even when the fault event relates to one or multiple control units.

The device according to the invention for operating an electric machine comprising a rotatably mounted rotor and a motor winding, the motor winding being electrically connected to an electrical energy store by means of a power electronics, by a control unit specifically designed to perform the method according to the invention when used as intended. If the control unit is used as intended, then the method according to the invention is performed in the control unit or by the control unit. This, too, results in the aforementioned advantages. Preferably, the control unit is designed as a microcontroller.

The electric drive system according to the invention comprises an electric machine comprising a rotatably mounted rotor and a motor winding, the motor winding being electrically connected to an electrical energy store by means of power electronics. The drive system is characterized by means of the device according to the invention for operating the electric machine. This, too, results in the aforementioned advantages.

BRIEF DESCRIPTION OF THE DRAWINGS

The invention will be explained in greater detail hereinafter with reference to the drawings. Shown are.

DETAILED DESCRIPTION

Figure 1:
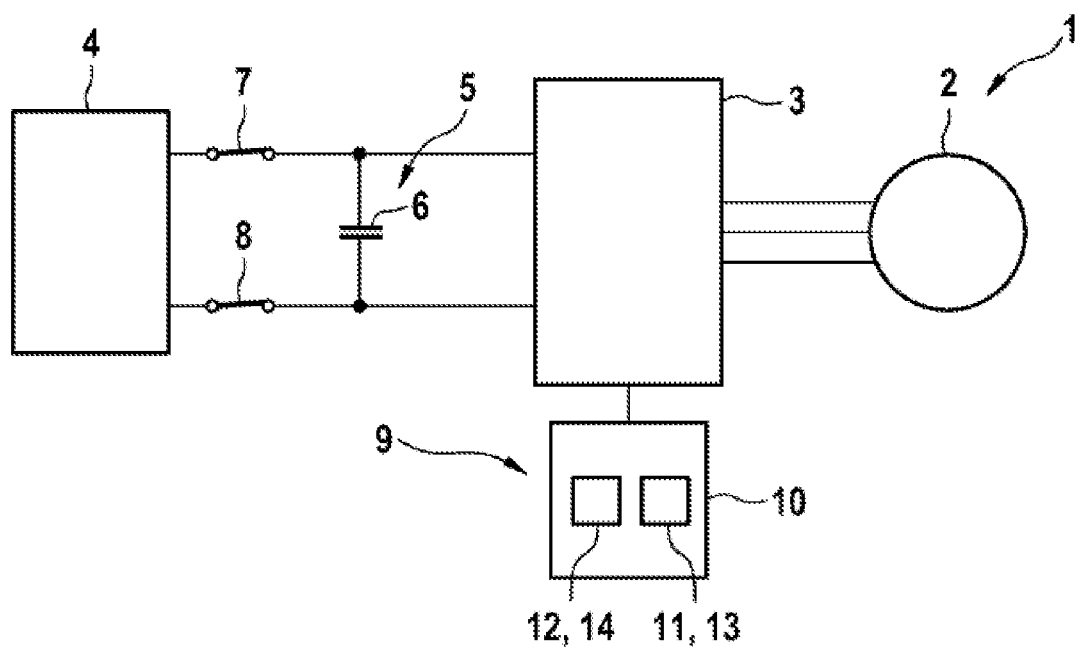
FIG. 1 an electric drive system,
FIG. 2 a method for operating an electric machine of the drive system,
FIG. 3 a first desired trajectory,
FIG. 4 current and voltage curves upon short-circuiting of a motor winding of the electric machine according to the first desired trajectory,
FIG. 5 a second desired trajectory, and
FIG. 6 a current curve and a voltage curve upon short-circuiting of the motor winding according to the second desired trajectory.

FIG. 1 shows a schematic diagram of an electric drive system 1 of a motor vehicle (not shown in further detail).

The drive system 1 comprises an electric machine 2. The electric machine 2 comprises a rotatably mounted rotor. The electric machine 2 further comprises a stator winding acting as a motor winding. The stator winding is arranged in a distributed manner around the rotor such that the rotor is rotatable by a suitable powering of the stator winding. In the present case, the stator winding comprises three phases.

The drive system 1 also comprises a power electronics 3 having multiple switching elements. For example, the power electronics 3 comprises a number of half bridges corresponding to the number of phases, in which case each of the half bridges comprises two respective switching elements. The power electronics 3 also comprises an electrical DC link 5 having a DC link capacitor 6.

The stator winding is electrically connected to an electrical energy store 4 of the drive system 1 by means of the power electronics 3.

Two battery contactors 7 and 8 are associated with the energy store 4. An electrical connection between the power electronics 3 and the energy store 4 can be optionally produced or interrupted by the battery contactors 7 and 8.

The drive system 1 also comprises an apparatus 9 having a control unit 10. In the present case, the control unit 10 is a microcontroller 10. The control unit 10 is designed to drive the switching elements of the power electronics 3 in order to achieve a desired powering of the phases of the stator winding.

The control unit 10 comprises a first computing unit 11 and a second computing unit 12. The first computing unit 11 comprises a current controller 13. The second computing unit 12 comprises a model predictive controller 14. The control unit 10 is designed to determine triggering signals for the switching elements of the power electronics 3 by means of the controllers 13 and 14 and to trigger the switching elements according to the ascertained triggering signals, as will be explained in further detail below in relation to FIG. 2.

Figure 2:
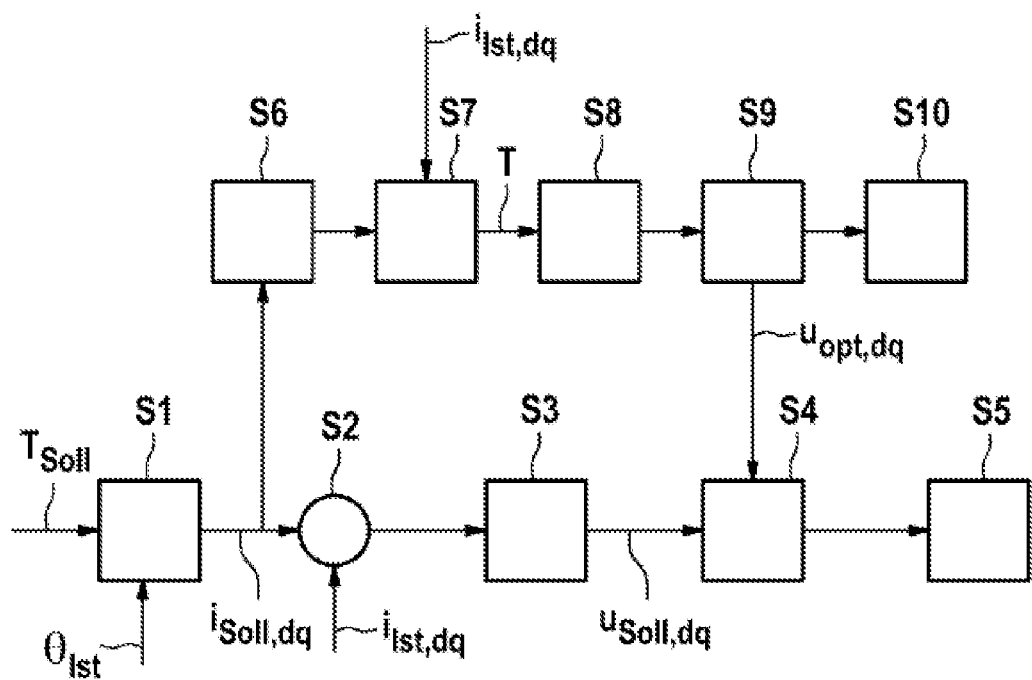

FIG. 2 shows an advantageous method for operating the electric machine 2 in reference to a flow chart.

In a first step S1, the control unit 10 ascertains a desired current vector $i_{target,dq}$ according to a specified desired torque $T_{target}$ on the one hand and an actual rotation angle $\theta_{actual}$ on the other hand. In this case, the desired torque $T_{target}$ is specified, e.g., according to an actuation of an acceleration pedal of the motor vehicle. The actual rotation angle $\theta_{actual}$ is sensed, e.g., by a rotation angle sensor associated with the rotor. The desired current vector $i_{target,dq}$ is a current vector relative to a rotor-fixed coordinate system. The current vector in this case describes the current vector of a torque-forming current $i_q$ on the one hand and the current value of a flow-forming current is on the other hand. The current vector corresponds to a working point of the electric machine. In this respect, the desired current vector $i_{target,dq}$ of the electric machine 2 is the desired working point of the electric machine 2.

In a second step S2, the control unit 10 ascertains a difference between the desired current vector $i_{target,dq}$ on the one hand and an ascertained actual current vector $i_{actual,dq}$ on the other hand. For example, the actual current vector $i_{actual,dq}$ is ascertained according to the actual phase currents flowing through the phases of the motor winding by means of a d/q transformation. The actual current vector $i_{actual,dq}$ corresponds to a current actual working point of the electric machine 2.

In a third step S3, the control unit 10 ascertains a desired voltage vector $U_{target,dq}$ relative to the rotor-fixed coordinate system by means of the current controller 13. The desired voltage vector $U_{target,dq}$ describes terminal voltages to be applied to the phases of the stator winding so that the difference between the desired current vector $i_{target,dq}$ and the actual current vector $i_{actual,dq}$ is reduced.

In a fourth step S4, the control unit 10 ascertains triggering signals for the switching elements of the power electronics 3 according to the desired voltage vector $U_{target,dq}$.

In a fifth step S5, the control unit 10 controls the switching elements according to the triggering signals ascertained in step S4.

Steps S1 to S5 are performed continuously during normal operation of the electric machine 2 such that field-oriented control of the electric machine 2 takes place by means of steps S1 to S5.

In a sixth step S6, a threshold current value for the actual current vector $i_{actual,dq}$ as well as a threshold voltage for the terminal voltages is specified.

In a seventh step S7, the control unit 10 ascertains a desired trajectory for the actual current vector $i_{actual,dq}$ by means of the model predictive controller 14, whereby the desired trajectory extends from the current actual working point of the machine 2 to a short-circuit working point of the machine 2. The short-circuit working point is the working point of the machine 2 the machine 2 assumes when the phases of the motor winding are short-circuited.

The model predictive controller 14 in this case ascertains the desired trajectory such that a time-optimized setting of the short-circuit working point starting from the current actual working point is achieved by changing the actual current vector $i_{actual,dq}$ along the desired trajectory. For this purpose, the model predictive controller 14 ascertains the desired trajectory according to a model of the electric machine 2.

The model predictive controller 14 also considers the specified threshold current value when determining the desired trajectory. For this purpose, the model predictive controller 14 ascertains the desired trajectory in such a way that the actual current vector $i_{actual,dq}$ always falls below the threshold current value when setting the short-circuit working point, i.e., upon short-circuiting of the motor winding, along the desired trajectory.

The model predictive controller 14 also considers the specified threshold voltage value when determining the desired trajectory. For this purpose, the model predictive controller 14 ascertains the desired trajectory such that the terminal voltages always fall below the threshold voltage value when setting the short-circuit working point along the desired trajectory.

In an eighth step S8, the model predictive controller 14 predicts a pilot control action according to the ascertained desired trajectory. In the present case, the model predictive controller 14 predicts as a pilot control action a control sequence comprising multiple rotor-fixed coordinate system-based optimized voltage vectors $u_{opt,dq}$. If the phases are sequentially exposed to electrical terminal voltages according to the voltage vectors $u_{opt,dq}$, then the short-circuit working point of the machine 2 is set based on the current working point of the machine 2 such that the curve of the current vector $i_{actual,dq}$ at least substantially corresponds to the desired trajectory.

Steps S6 to S8 are performed continuously so that a desired trajectory is always ascertained and a pilot control action is predicted for the current working points of the machine 2.

In a ninth step S9, the motor vehicle and the electric machine 2 are monitored in respect of fault events. If a fault event is detected in step S9, then the triggering signals are ascertained in step S4 according to the predicted pilot control action. The consideration of the desired voltage vector $u_{target,dq}$ is suspended. Accordingly, in step S5, the switching elements are then triggered according to triggering signals which were ascertained according to the predicted pilot control action. As a result, the short-circuit working point is time-optimized and is set without overloading the power electronics 3 and the motor winding.

Optionally, if a fault event is detected, then the energy store 4 is electrically separated from the power electronics 3 in a tenth step S10. For this purpose, the battery contactor 7 and/or the battery contactor 8 are connected in a non-conductive manner.

If the optional step S10 is performed, then a voltage threshold for a DC link voltage of the DC link 5 as well as a desired voltage for the DC link voltage are preferably also specified in the sixth step S6.

The model predictive controller 14 also considers the specified threshold voltage value when determining the desired trajectory. For this purpose, the model predictive controller 14 ascertains the desired trajectory such that the DC link voltages always fall below the threshold voltage value when setting the short-circuit working point along the desired trajectory.

In addition, the model predictive controller 14 also considers the specified desired voltage when ascertaining the desired trajectory. For this purpose, the model predictive controller 14 ascertains the desired trajectory in such a way that the DC link voltage matches the desired voltage when the short-circuit working point is reached.

According to a further exemplary embodiment, the desired trajectory is ascertained in pilot control action tests, and the pilot control action is predicted in pilot control action tests. In this case, the pilot control action is then stored in a data store associated with the machine 2. If a fault event is detected in this exemplary embodiment, the pilot control action is not predicted according to method steps S7 and S8, but rather provided by the data store. According to a further exemplary embodiment, the triggering signals for the switching elements are already ascertained in the pilot control action tests and stored in the data store instead of the pilot control action. Preferably, a desired trajectory is respectively ascertained and a pilot control action is respectively predicted for multiple potential actual working points, the pilot control actions or triggering signals then preferably being stored in a characteristic map.

Figure 3:
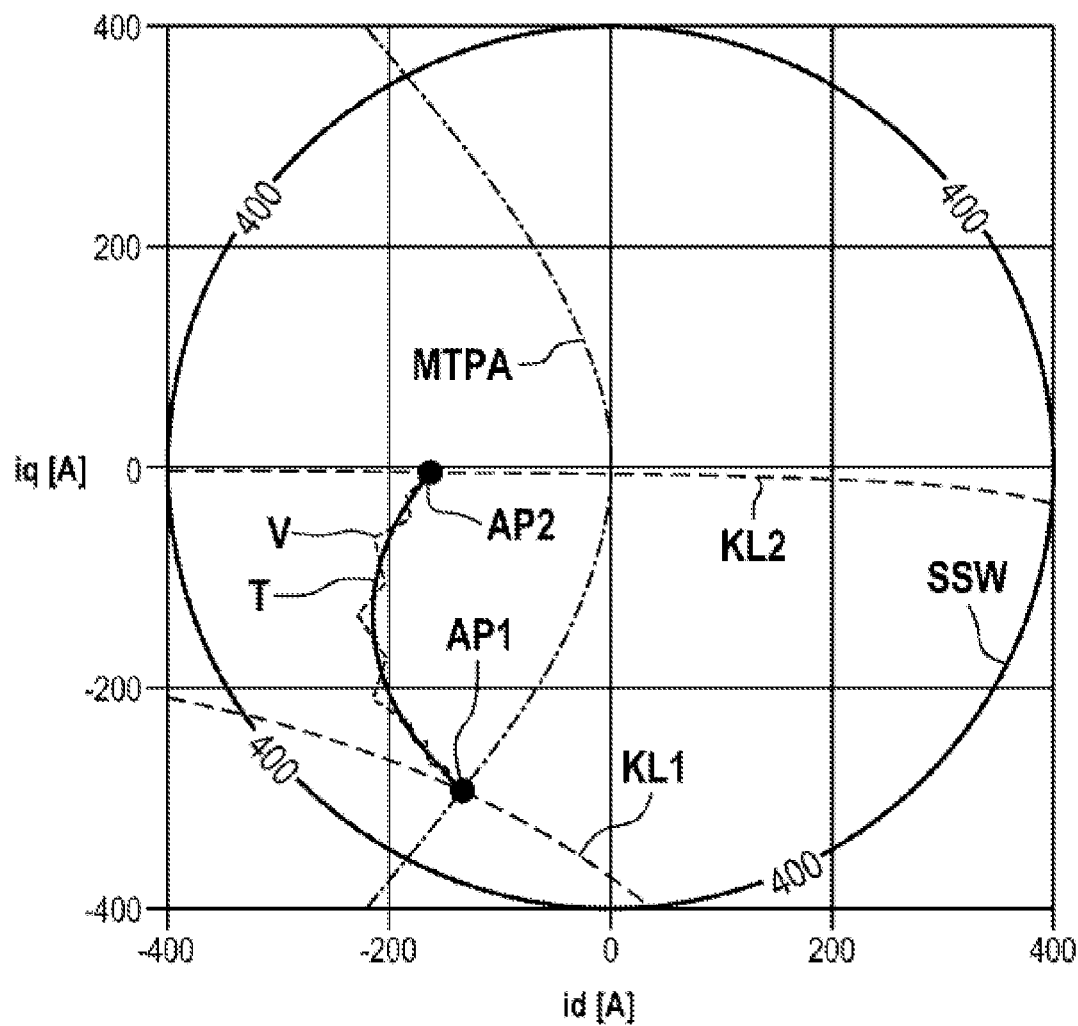

FIG. 3 shows a current location curve in which a first desired trajectory T is illustrated. Neither a voltage threshold for the DC link voltage nor a desired voltage for the DC link voltage were considered when ascertaining said first desired trajectory T.

As can be seen from FIG. 3, the threshold current value SSW in the present case is 400 amperes. The current actual working point AP1 corresponds to an intersection point of a first ISO torque characteristic curve KL1 with the MTPA curve. In this case, the current actual working point AP1 is in the third quadrant of the current location curve. Accordingly, the machine 2 is currently operating generatively. The short-circuit working point AP2 is on a second ISO torque characteristic curve KL2. The curve V of the actual current vector $i_{actual,dq}$ corresponds to the desired trajectory T when setting the short-circuit working point AP2 according to the pilot control action.

Figure 4:
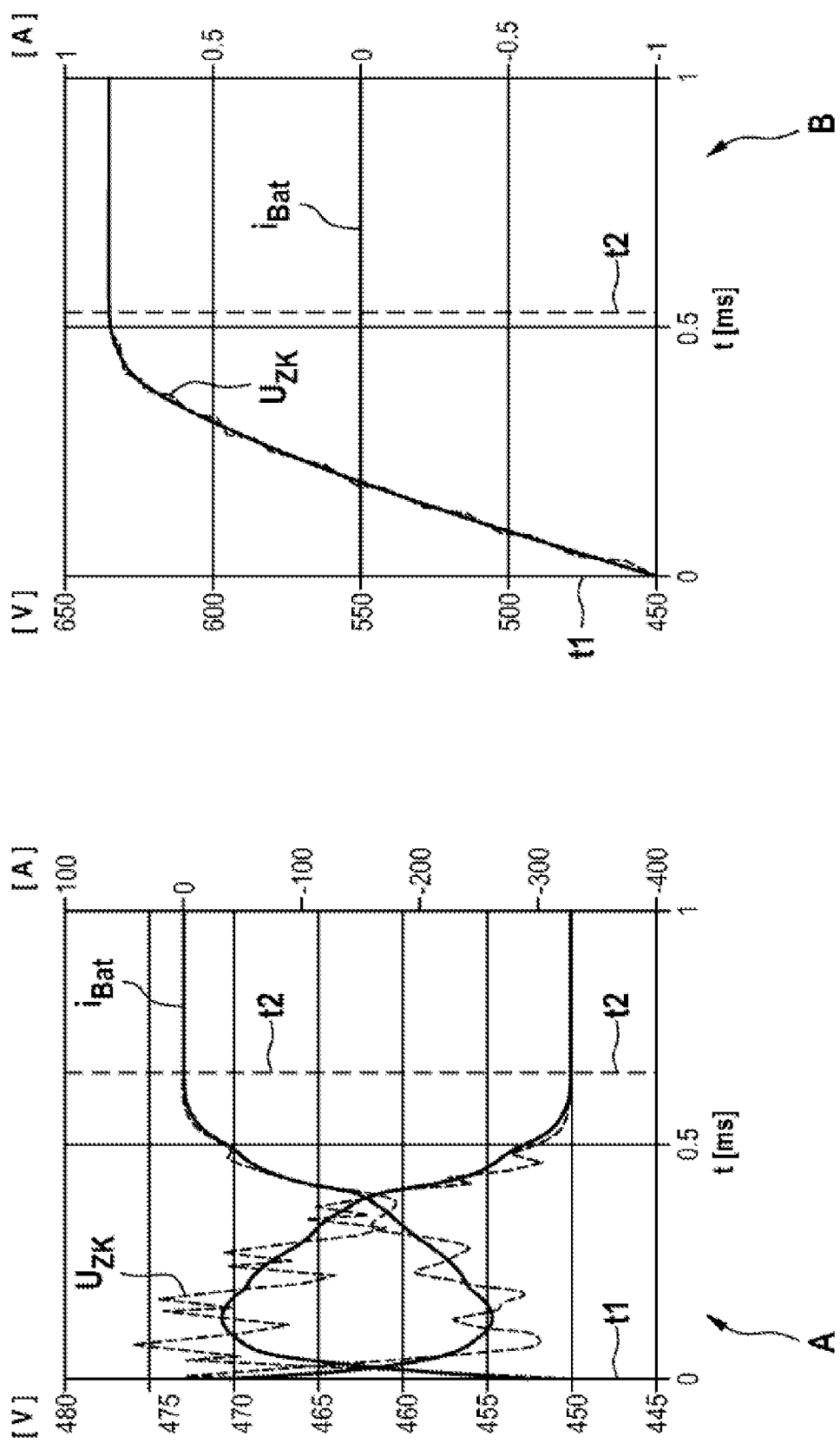

FIG. 4 shows a left-hand illustration A and a right-hand illustration B. In both illustrations A and B, the curve of the DC link voltage $U_{ZK}$ and the curve of a battery current $i_{Bat}$ when setting the short-circuit working point AP2 according to the first desired trajectory T are shown. In the left-hand illustration A, the energy store 4 is in this case electrically connected to the power electronics 3. In the right-hand illustration B, the energy store 4 is electrically separated from the power electronics 3.

The setting of the short-circuit working point AP2 is started at a first point in time t1. The switching elements of the power electronics 3 are thus triggered as of the first point of time t1 according to the predicted pilot control action. The short-circuit working point AP2 is achieved at a second point in time t2. The DC link voltage $U_{ZK}$ and the battery current $i_{Bat}$ are at least substantially constant as of this point in time. As can be seen from illustrations A and B, a duration of about 500 µs to 700 µs is only required to set the short-circuit working point AP2.

As can be seen from illustration A, the DC link voltage $U_{ZK}$ increases upon the short-circuit only by about 25 V, because charge carriers are supplied to the energy store 4 with increasing DC link voltage $U_{ZK}$ in the form of the battery current mat. Accordingly, if the energy store 4 is electrically connected to the power electronics 3, then the short-circuit working point AP2 can be set quickly and without overloading the DC link 5 according to the first desired trajectory T.

As can be seen from illustration B, the DC link voltage $U_{ZK}$ increases significantly further with the energy store 4 being electrically separated from the DC link 5 than with the energy store 4 being electrically connected to the DC link 5.

Figure 5:
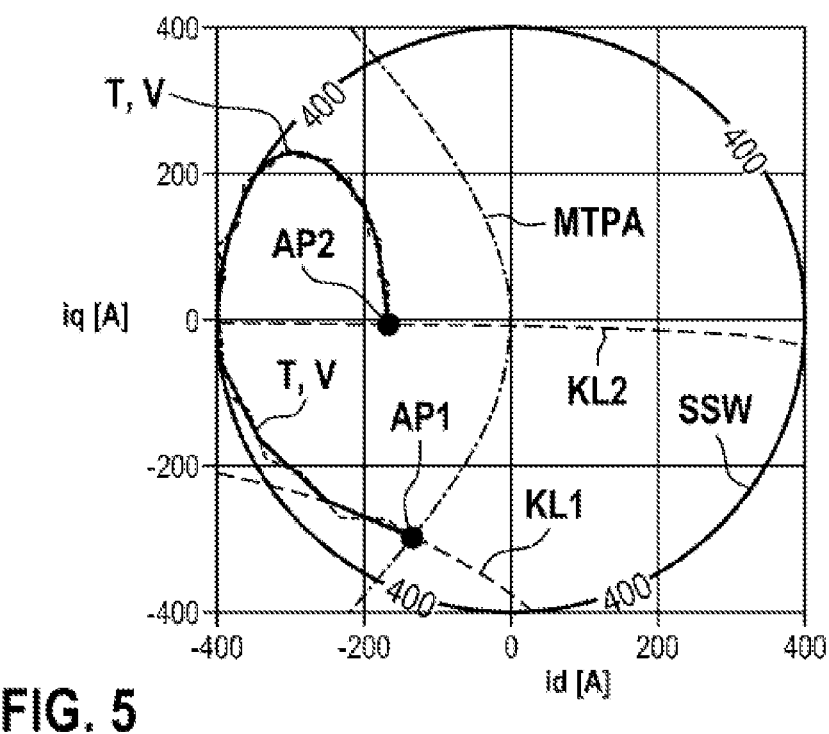

FIG. 5 shows a current location curve in which a second desired trajectory T is illustrated. The voltage threshold for the DC link voltage $U_{ZK}$ as well as the desired voltage for the DC link voltage $U_{ZK}$ were considered when ascertaining the second desired trajectory T by the model predictive controller 14. In the present case, a voltage threshold of 480 V as well as a desired voltage of 385 V were specified.

As can be seen from FIG. 5, the second desired trajectory T initially extends from the actual working point AP1 into the second quadrant of the current location curve. A reduction of the DC link voltage $U_{ZK}$ is thereby achieved when setting the short-circuit working point AP2.

Figure 6:
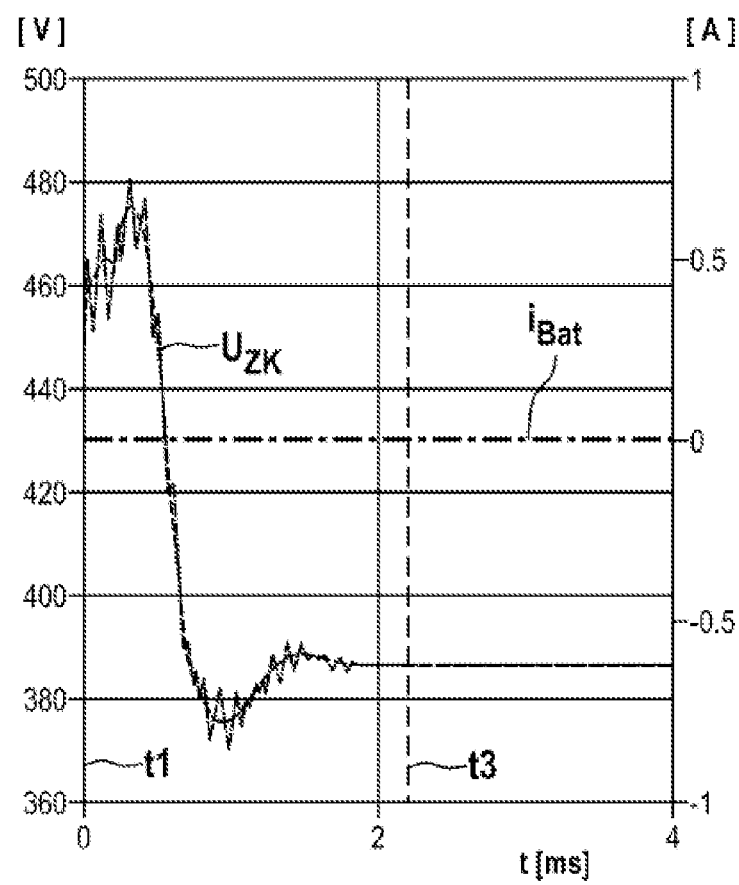

In FIG. 6, the curve of the DC link voltage $U_{ZK}$ and the curve of the battery current $i_{Bat}$ when setting the short-circuit working point AP2 according to the second desired trajectory T are shown. The energy store 4 is in this case electrically separated from the power electronics 3. As can be seen from FIG. 6, the DC link voltage $U_{ZK}$ nonetheless only temporarily increases to about 480 V and subsequently drops to about 385 V. The DC link 5 is therefore not overloaded. The second desired trajectory T is thus particularly advantageous when the energy store 4 is electrically separated from the DC link 5.

Compared to the setting of the short-circuit working point AP2 according to the first desired trajectory T, a longer time period is required for the setting of the short-circuit working point AP2 according to the second desired trajectory T. As can be seen from FIG. 5, the short-circuit working point AP2 is achieved at a third point in time t3. The setting of the short-circuit working point AP2 in this case requires approximately 1.8 ms.

The invention claimed is:

1. A method for operating an electric machine comprising a rotatably mounted rotor and a motor winding, wherein the motor winding is electrically connected to an electrical energy store (4) by means of a power electronics (3), the method comprising:
   monitoring the machine (2) and/or an apparatus comprising the machine (2) for fault events, and
   short circuiting the motor winding by triggering the power electronics (3) upon detection of a fault event, wherein a desired trajectory (T) for an actual current vector ($i_{actual,dq}$) of an electric motor current flowing through the motor winding is ascertained, wherein the desired trajectory (T) extends from a current actual working point (AP1) of the machine (2) to a short-circuit working point (AP2) of the machine (2), wherein a pilot control action is predicted according to the desired trajectory (T), and wherein the power electronics (3) are triggered to short-circuit the motor winding according to the pilot control action in such a way that when the motor winding is short-circuited, a curve (V) of the actual current vector ($i_{actual,dq}$) at least substantially matches the desired trajectory (T).

2. The method according to claim 1, wherein the desired trajectory (T) is ascertained according to the current actual working point (AP1) during operation of the electric machine (2).

3. The method according to claim 1, wherein the desired trajectory (T) is ascertained in pilot control action tests.

4. The method according to claim 3, wherein one desired trajectory (T) is respectively ascertained for multiple potential actual working points (AP1).

5. The method according to claim 1, wherein the desired trajectory (T) is ascertained according to a model of the electric machine (2).

6. The method according to claim 1, wherein a threshold current value (SSW) is specified, wherein the desired trajectory (T) is ascertained according to the threshold current value (SSW) in such a way that a current value of the actual current vector ($i_{actual,dq}$) always falls below the threshold current value (SSW) when the motor winding is short-circuited.

7. The method according to claim 1, wherein a threshold voltage value is specified, wherein the desired trajectory (T) is ascertained according to the threshold voltage value in such a way that voltage values of electrical terminal voltages of the machine (2) always fall below the threshold voltage value when the motor winding is short-circuited.

8. The method according to claim 1, wherein the desired trajectory (T) is ascertained according to a DC link voltage ($U_{zk}$) of a DC link (5) of the power electronics (3).

9. The method according to claim 8, wherein a voltage threshold for the DC link voltage ($U_{zk}$) is specified, wherein the desired trajectory (T) is ascertained according to the voltage threshold in such a way that the DC link voltage ($U_{zk}$) always falls below the voltage threshold when the motor winding is short-circuited.

10. The method according to claim 8, wherein a desired voltage for the DC link voltage ($U_{zk}$) is specified, wherein the desired trajectory (T) is ascertained according to the desired voltage in such a way that the DC link voltage ($U_{zk}$) matches the desired voltage upon reaching the short-circuit working point (AP2).

11. The method according to claim 1, wherein the desired trajectory (T) is ascertained by a model predictive controller (14).

12. The method according to claim 1, wherein a sensor signal of a sensor is compared to a specified threshold value, and that the fault event is detected according to the comparison.

13. The method according to claim 1, wherein the electric machine (2) is controlled into the short-circuit working point upon detection of the fault event according to the pilot control action.

14. A device for operating an electric machine, wherein the machine (2) comprises a rotatably mounted rotor and a motor winding, and wherein the motor winding is electrically connected to an electrical energy store (4) by means of a power electronics (3), wherein a control unit (10) is configured to
   monitor the machine (2) and/or an apparatus comprising the machine (2) for fault events, and
   short circuit the motor winding by triggering the power electronics (3) upon detection of a fault event, wherein a desired trajectory (T) for an actual current vector ($i_{actual,dq}$) of an electric motor current flowing through the motor winding is ascertained, wherein the desired trajectory (T) extends from a current actual working point (AP1) of the machine (2) to a short-circuit working point (AP2) of the machine (2), wherein a pilot control action is predicted according to the desired trajectory (T), and wherein the power electronics (3) are triggered to short-circuit the motor winding according to the pilot control action in such a way that when the motor winding is short-circuited, a curve (V) of the actual current vector ($i_{actual,dq}$) at least substantially matches the desired trajectory (T).

15. An electrical drive system having an electrical machine (2) comprising a rotatably mounted rotor and a motor winding, wherein the motor winding is electrically connected to an electrical energy store (4) by means of a power electronics (3), characterized by a device (9) according to claim 14 for operating the electrical machine (2).

\* \* \* \* \*